(12) United States Patent
Lindquist

(10) Patent No.: US 6,741,669 B2
(45) Date of Patent: May 25, 2004

(54) NEUTRON ABSORBER SYSTEMS AND METHOD FOR ABSORBING NEUTRONS

(76) Inventor: Kenneth O. Lindquist, 650 School House Rd., Saugerties, NY (US) 12477

( * ) Notice: Subject to any disclaimer, the term of this patent is extended or adjusted under 35 U.S.C. 154(b) by 0 days.

(21) Appl. No.: 10/001,402

(22) Filed: Oct. 25, 2001

(65) Prior Publication Data

US 2003/0081714 A1 May 1, 2003

(51) Int. Cl.$^7$ ............................................. G21C 19/00
(52) U.S. Cl. .................. 376/272; 376/335; 376/327
(58) Field of Search ................................ 376/335, 327, 376/272

(56) References Cited

U.S. PATENT DOCUMENTS

| | | | | |
|---|---|---|---|---|
| 4,218,622 A | | 8/1980 | McMurtry et al. ........... 250/518 |
| 4,225,467 A | | 9/1980 | McMurtry et al. ........... 252/478 |
| 4,292,528 A | | 9/1981 | Shaffer et al. .............. 250/506 |
| 4,313,973 A | | 2/1982 | McMurtry et al. ........... 427/205 |
| 4,581,201 A | * | 4/1986 | Haggstrom et al. ......... 376/327 |
| 4,605,440 A | | 8/1986 | Halverson et al. ............ 75/238 |
| 4,788,029 A | | 11/1988 | Kerjean ....................... 376/272 |
| 4,820,472 A | | 4/1989 | Machado et al. ........... 376/272 |
| 4,827,139 A | * | 5/1989 | Wells et al. ............... 250/507.1 |
| 4,900,505 A | | 2/1990 | Machado et al. ........... 376/272 |
| 4,960,560 A | | 10/1990 | Machado et al. ........... 376/272 |
| 5,198,183 A | | 3/1993 | Newman .................... 376/272 |
| 5,245,641 A | | 9/1993 | Machado et al. ........... 376/272 |
| 5,361,281 A | | 11/1994 | Porowski .................... 376/272 |
| 5,479,463 A | | 12/1995 | Roberts ....................... 376/339 |
| 5,579,274 A | * | 11/1996 | Van Buskirk et al. .... 365/185.21 |
| 5,629,964 A | | 5/1997 | Roberts ....................... 376/327 |
| 5,786,611 A | | 7/1998 | Quapp et al. ............. 250/515.1 |
| 5,841,825 A | | 11/1998 | Roberts ....................... 376/272 |
| 5,848,111 A | | 12/1998 | Wells et al. ................ 376/272 |
| 5,905,770 A | * | 5/1999 | Wasinger .................... 376/272 |
| 5,909,475 A | | 6/1999 | Wells et al. ................ 376/272 |
| 5,965,829 A | | 10/1999 | Haynes et al. ............... 75/238 |
| 6,061,414 A | | 5/2000 | Kopecky et al. ............ 376/260 |
| 6,166,390 A | | 12/2000 | Quapp et al. ............. 250/506.1 |

FOREIGN PATENT DOCUMENTS

JP      2-129598    *   5/1990

* cited by examiner

Primary Examiner—Michael J. Carone
Assistant Examiner—Rick Palabrica
(74) Attorney, Agent, or Firm—Heslin Rothenberg Farley & Mesiti P.C.; Victor A. Cardona, Esq.

(57) ABSTRACT

A neutron absorber system for a nuclear fuel storage rack includes a neutron absorber, which is adapted to attach to a plurality of cell walls of a cell of the nuclear fuel storage rack. The neutron absorber is adapted to elastically deform to cause the attaching. A system for inserting a neutron absorber into the nuclear fuel storage rack includes means for applying at least one stress to the neutron absorber and means for releasing the at least one stress to cause the neutron absorber to attach to the plurality of cell walls of the cell of the nuclear fuel storage rack.

7 Claims, 11 Drawing Sheets

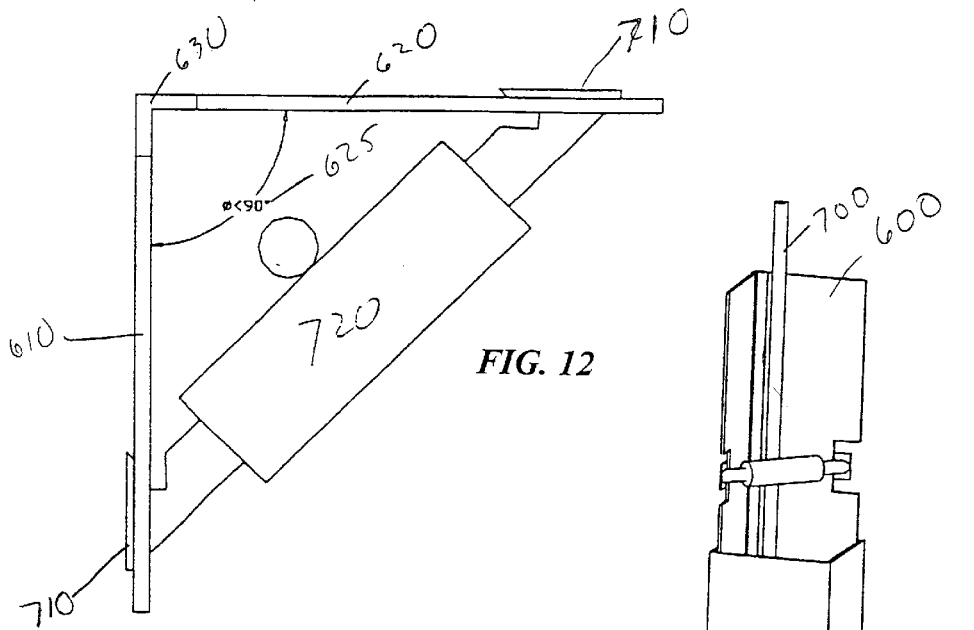
FIG. 12
FIG. 13
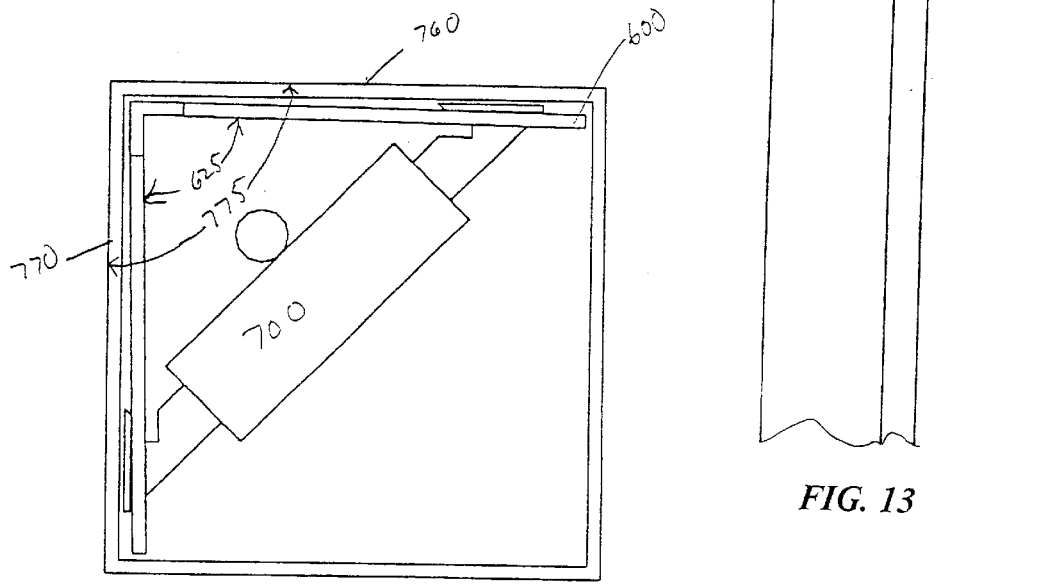
FIG. 14

NEUTRON ABSORBER SYSTEMS AND METHOD FOR ABSORBING NEUTRONS

TECHNICAL FIELD

This invention relates generally to spent nuclear fuel storage and more particularly to systems and methods for absorbing neutrons in a nuclear fuel storage rack.

BACKGROUND OF THE INVENTION

Nuclear power plants store their spent nuclear fuel in spent fuel storage racks located in on site storage pools. Such racks may be, for example, a Flux Trap Nuclear Fuel Storage Rack 10 as depicted in FIG. 1 or an Eggcrate Nuclear Fuel Storage Rack 100 as depicted in FIG. 2. These racks include neutron absorber material 20 (FIGS. 1–2 and 17–18) to control the re-activity state of the fuel/rack system which is located between a stainless steel inner cell wall 7 and a stainless steel wrapper 9. Specifically, such absorbers are utilized to neutronically decouple adjacent fuel cell assemblies by maintaining a subcritical condition. In a flux trap storage rack (FIG. 1), two plates of absorber material 20 separate each storage cell. For example, storage cell 30 and storage cell 35 are separated by plates 32 and 33. In an eggcrate system (FIG. 2), one plate of absorber material separates each storage cell. For example, cell 50 and cell 60 are separated by a plate 55.

This absorber material may be a boron bearing compound in a metal or polymer matrix which may degrade over time as it absorbs neutrons from the spent fuel. For example, the absorber material may be formed of a polymer matrix containing boron carbide (e.g., a BORAFLEX type polymer) and the absorber material may degrade and decrease over a period of several years. Also, charge enrichments for reload fuel for nuclear reactors are generally increasing relative to previous change enrichments and can be as high as 5.0 w/o U-235. The degradation of the absorber material and the use of higher enrichments require replacement of the spent fuel storage racks with racks containing additional absorber material or the insertion of additional absorber material into existing spent nuclear fuel storage racks to control the re-activity state of the fuel/rack system.

Thus, there is a need for a systems and methods for absorbing neutrons in spent nuclear fuel storage racks and particularly systems and methods for restoring neutron absorbing material into spent nuclear fuel storage racks.

SUMMARY OF THE INVENTION

The present invention provides, in a first aspect, a neutron absorber system for a nuclear fuel storage rack. The system includes a neutron absorber, which is adapted to attach to a plurality of cell walls of a cell of the nuclear fuel storage rack. The neutron absorber is adapted to elastically deform to cause it to be attached to the plurality of cell walls.

The present invention provides, in a second aspect, a method of inserting a neutron absorber into a nuclear fuel storage rack. The method includes applying at least one stress to the neutron absorber to cause the absorber to deform and releasing the stress to cause the neutron absorber to attach to the plurality of cell walls of a cell of the nuclear fuel storage rack.

The present invention provides, in a third aspect, a system for inserting a neutron absorber into a nuclear fuel storage rack. The system includes means for applying at least one stress to the neutron absorber wherein the neutron absorber is adapted to elastically deform. The system further includes means for releasing the at least one stress to cause the neutron absorber to attach to the plurality of cell walls of a cell of the nuclear fuel storage rack.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be readily understood from the following detailed description of preferred embodiments taken in conjunction with the accompanying drawings in which:

FIG. 12 is a top elevational view of the neutron absorber and installation tool of FIG. 9;

FIG. 13 is a side perspective view of the neutron absorber and installation tool of FIG. 9 being inserted into a cell of a fuel storage rack;

FIG. 14 is a top elevational view of FIG. 13 showing the neutron absorber and installation tool being inserted into the cell of the fuel storage rack;

DETAILED DESCRIPTION

In accordance with principles of present invention, examples of systems and methods for absorbing neutrons in spent nuclear fuel storage racks are depicted in FIGS. 3–16 and described in detail herein.

Figure 1:
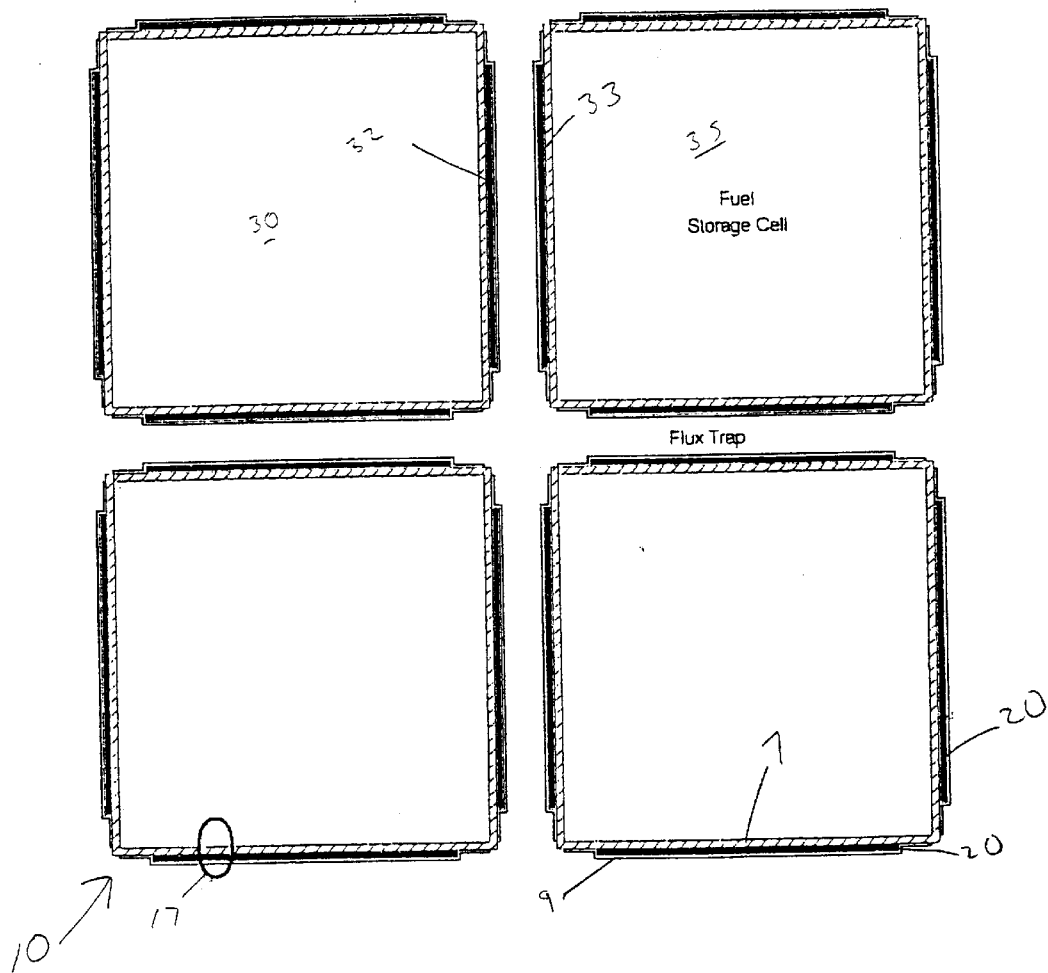
FIG. 1 is a top elevational view of a flux trap nuclear fuel storage rack.
Figure 2:
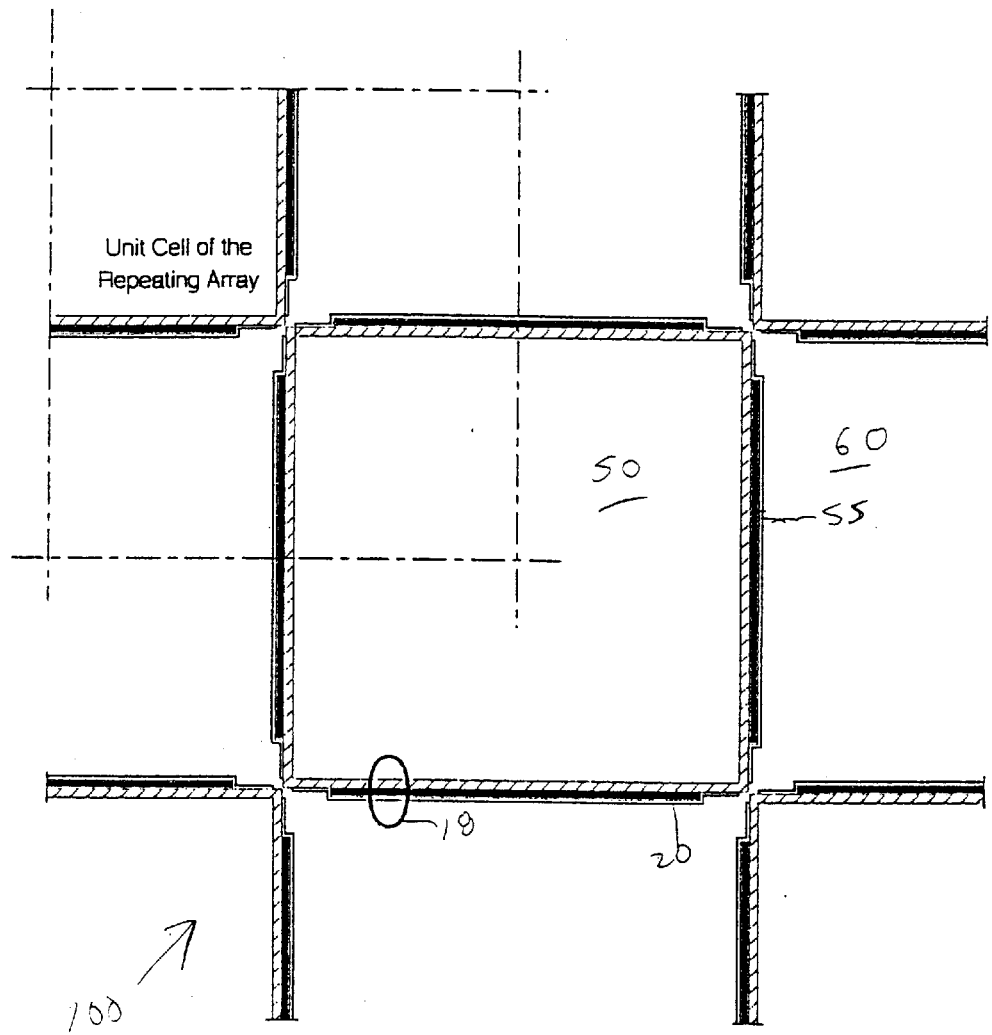
FIG. 2 is a top elevational view of an eggcrate nuclear fuel storage rack.
Figure 3:
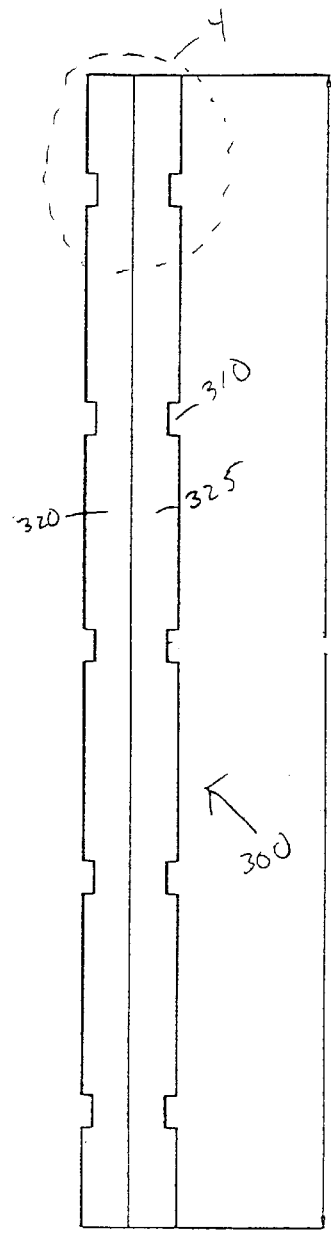
FIG. 3 is a side elevational view of a neutron absorber in accordance with the principals of the present invention.
Figure 4:
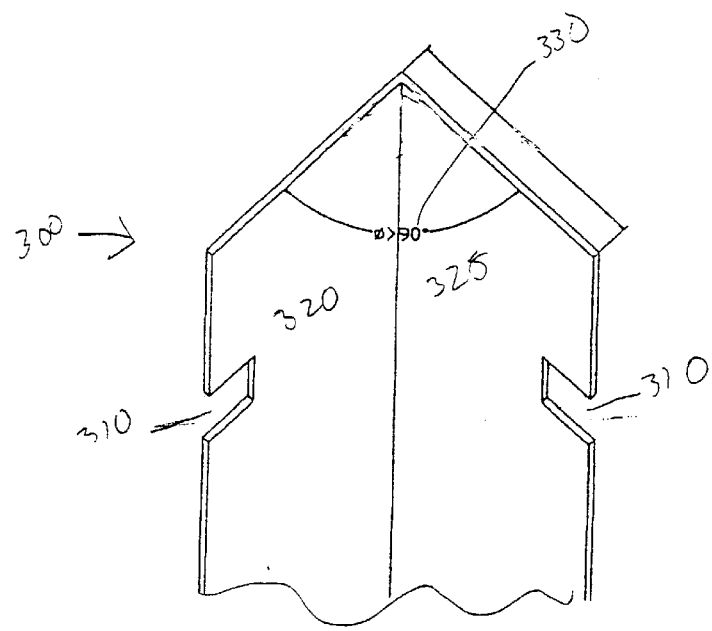
FIG. 4 is an enlarged side perspective view of a portion of the neutron absorber of FIG. 3.

FIGS. 3–4 depict one embodiment of a neutron absorber 300 for insertion into a cell of a spent nuclear fuel storage rack, for example, Flux Trap Nuclear Fuel Storage Rack 10 (FIG. 1) or Eggcrate Nuclear Fuel Storage Rack 100 (FIG. 2). Neutron absorber 300 has a chevron shape as best depicted in FIG. 4. Further, neutron absorber 300 is formed of a metal composite which includes neutron absorbing material, for example, boron carbide or a metal boron alloy.

Such alloys may include alloys of aluminum, magnesium, titanium, aluminum/magnesium or aluminum/titanium, in combination with boron, for example. Stainless steel/boron alloys may also be used. Besides boron carbide and elemental boron, any element with a high thermal neutron absorption cross section may be substituted for boron. Further, neutron absorber 300 may be formed of materials occurring as a compound in either amorphous or crystalline powder form which has a fairly uniform particle size distribution, for example, gadolina ($Gd_2O_3$) and erbia ($Er_2O_3$).

Figure 5:
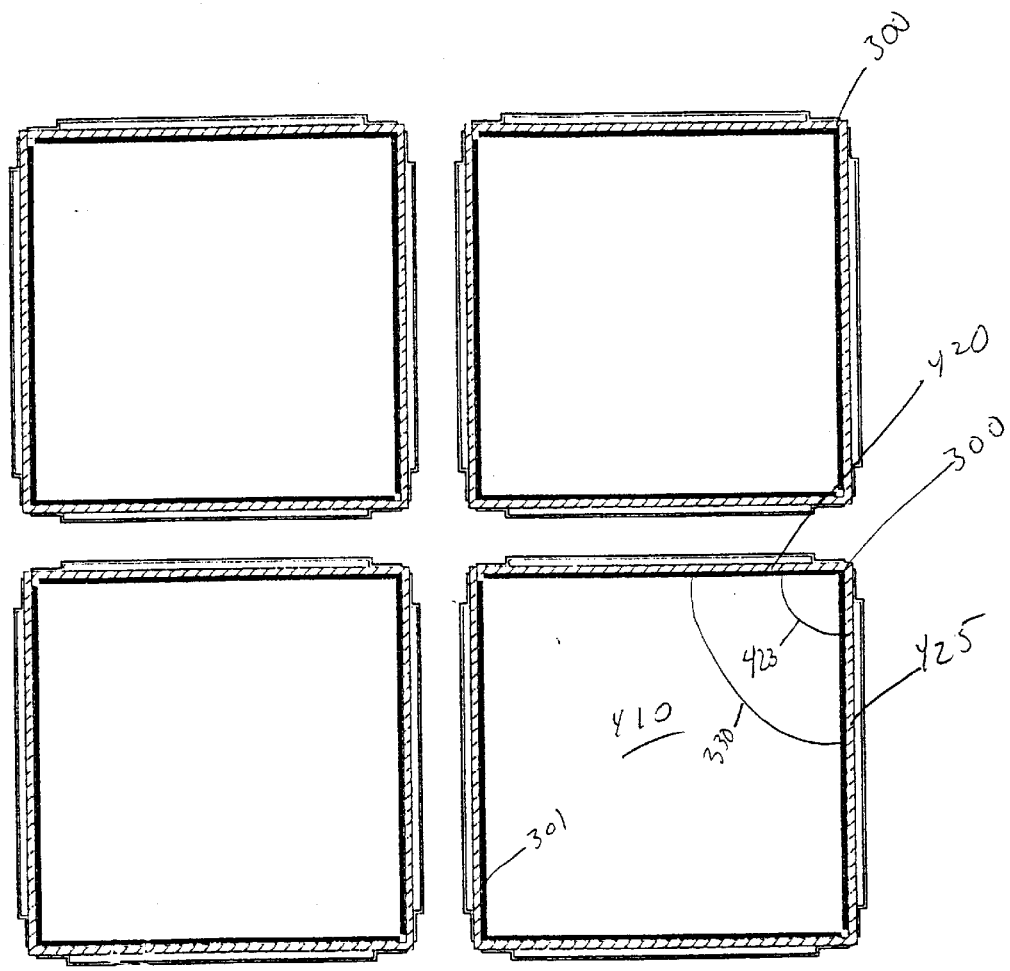
FIG. 5 is a top elevational view of the neutron absorber of FIG. 3 installed in the flux trap fuel storage rack of FIG. 1.

Referring to FIGS. 3–4, neutron absorber 300 is formed about a height of a cell of a spent nuclear fuel storage rack. Also, neutron absorber 300 includes a first portion 320 and a second portion 325 which have an angle 330 between them. Neutron absorber 300 is adapted to be deformed to cause angle 330 to decrease from its static position, for example, from greater than 90 degrees to less than 90 degrees. Neutron absorber 300 may be formed of a material having a modulus of elasticity of $10 \times 10^6$ psi to $20 \times 10^6$ psi, for example. This elastic deformability and its chevron shape allow neutron absorber 300 to be inserted into a cell 410 of a flux trap spent fuel storage rack 400 and attached between two walls of the cell, as depicted in FIG. 5. The higher the modulus of elasticity the greater the frictional locking force which is exerted on cell wall 410 when neutron absorber 300 is inserted therein. Also, first portion 320 and second portion 325 may be formed of a unitary material or they may be formed separately and attached to each other, for example, via standard TIG welding or by friction stir welding.

Further, neutron absorber 300 may also include notches 310 adapted to receive one or more stresses to cause the deformation of neutron absorber 300. Also, notches 310 may serve as capture points to lock neutron absorbers in place between the two walls of the cell of the spent nuclear fuel storage rack. For example, some cell walls have "dimples" (not shown) stamped on their faces, as is known to those skilled in the art, and notches 310 may be configured to engage such "dimples." In another example, a rack may include weldments and spacer rods which notches 310 may engage. Further, a rack may include other features protruding toward an interior of a cell which notches 310 may engage.

Referring to FIG. 5, cell 410 includes a first wall 420 and a second wall 425. Neutron absorber 300 may be elastically deformed from an unstressed condition in which angle 330 is greater than a cell angle 423 between first wall 420 and second wall 425 to a stressed condition wherein angle 330 is less than cell angle 423. Neutron absorber 300 in this stressed condition may be inserted into cell 410 and placed adjacent to first wall 420 and second wall 425. The stress may be released thus attaching neutron absorber 300 to first wall 420 and second wall 425, as depicted in FIG. 5.

A pressure friction fit caused by the release of the stress and the elastic return of first portion 320 and second portion 325 of neutron absorber 300 causes neutron absorber 300 to attach to first wall 420 and second wall 425 and remain in place. This pressure friction fit results because neutron absorber 300 does not completely return elastically to its pre-deformation position due to the presence of first wall 420 and second wall 425. Specifically, the elastic nature of the material of neutron absorber 300, which would return first portion 320 and second portion 325 to their pre-deformation position if first wall 420 and second wall 425 were not present, causes potential energy to be stored. Thus, a force tending to cause this elastic return instead causes the friction fit which attaches neutron absorber 300 to first wall 420 and second wall 425. Further, an additional neutron absorber 301 may be inserted into cell 410 opposite neutron absorber 300, as shown in FIG. 5.

Also, the frictional forces between neutron absorber 300 and first wall 420 and second wall 425 provide restraining forces sufficient to reduce or eliminate movement of neutron absorber 300 when fuel is inserted into or removed from cell 410, as is understood by those skilled in the art. For example, neutron absorber 300 may have a modulus of elasticity of $15 \times 10^6$ psi and in such a case, 1,075 pounds may be required to move or pull neutron absorber 300 in a vertical direction, that is, out of cell 410. In another example, neutron absorber 300 may have a modulus of elasticity of $20 \times 10^6$ psi which may require a force of 1,440 pounds to move neutron absorber 300 in a vertical direction out of cell 410.

Figure 6:
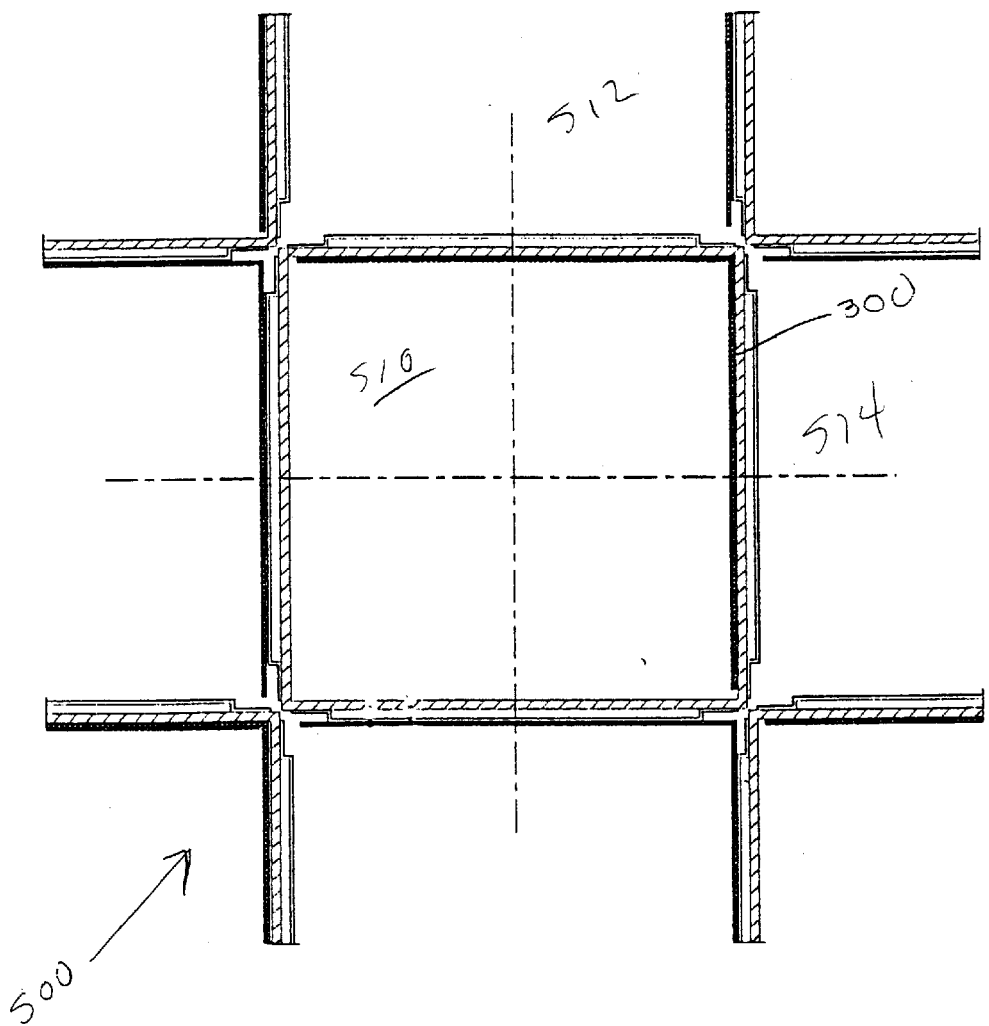
FIG. 6 is a top elevational view of the neutron absorber of FIG. 3 installed in the eggcrate fuel storage rack of FIG. 2.

Neutron absorber 300 may also be installed into an eggcrate style fuel storage rack 500, as depicted in FIG. 6, in the same manner as described above for fluxtrap spent fuel storage rack 400. Neutron absorber 300 thus located in cell 510 adjacent a second cell 512 and a third cell 514 neutronically decouples cell 510 from these other cells.

Figures 7, 8:
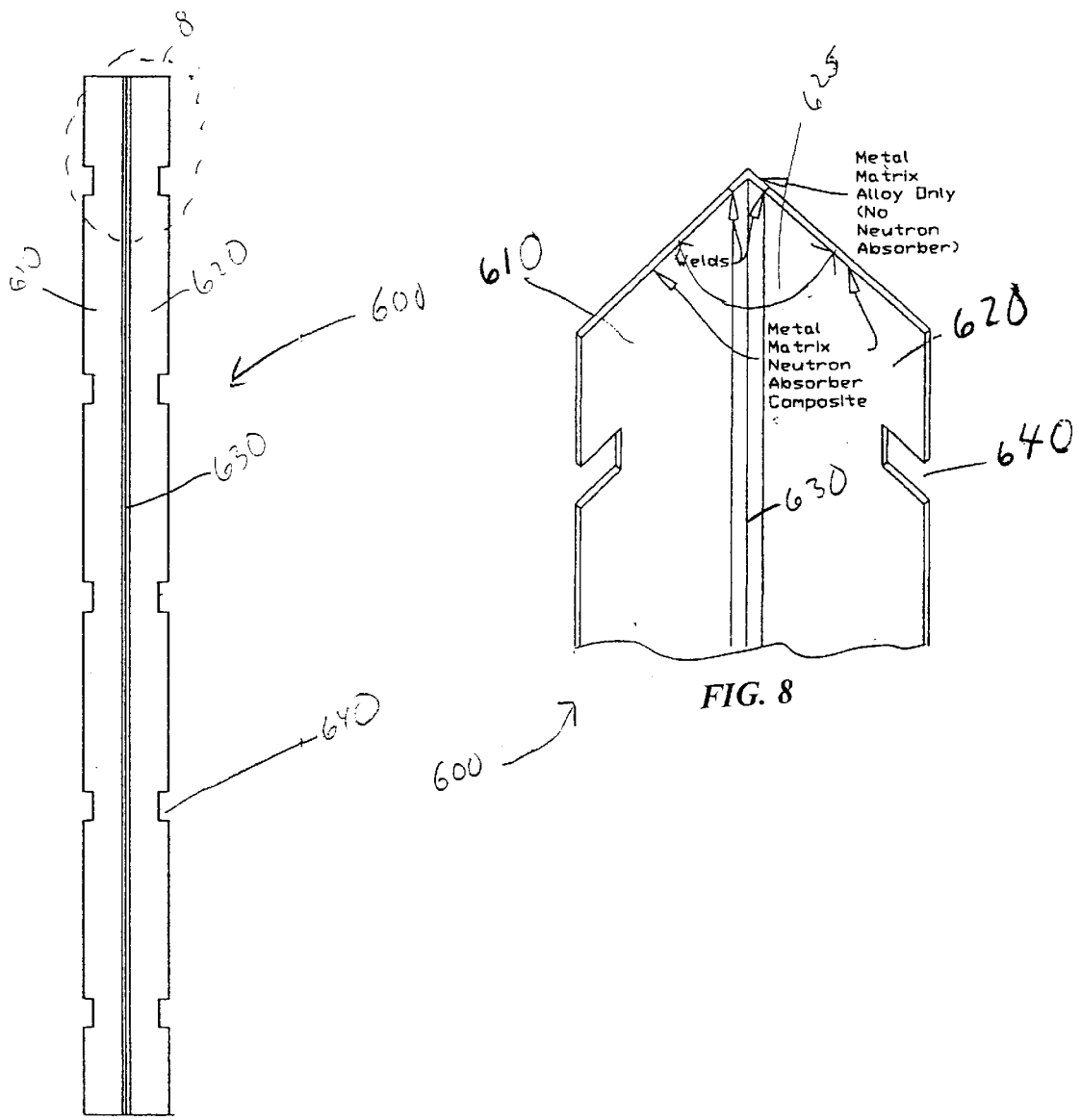
FIG. 7 is a side elevational view of another embodiment of a neutron absorber in accordance with the principals of the present invention.
FIG. 8 is an enlarged side perspective view of the neutron absorber of FIG. 7.

Another embodiment of a neutron absorber 600 for insertion into a cell of a spent fuel storage rack is illustrated in FIGS. 7–8. Neutron absorber 600 is chevron shaped and includes a first portion 610 and a second portion 620, which are connected to a third portion 630, for example, by standard TIG welding or by friction stir welding. Any welds between third portion 630 and first portion 610 or second portion 620 may be continuous or non-continuous. First portion 610 and second portion 620 are adapted to absorb neutrons and may include, for example, boron or another material in a metal alloy matrix capable of absorbing neutrons, as described above for neutron absorber 300. Third portion 630 is adapted to elastically deform to allow neutron absorber 600 to be attached to first wall 420 and/or second wall 425 of cell 410 and may be formed of the same alloy materials as first portion 610 and second portion 620, for example, but without the neutron absorber component (e.g., boron).

Specifically, third portion 630 is deformable to allow an angle 625 between first portion 610 and second portion 620 to be decreased to less than cell angle 423, as described above for absorber 300. A release of the stress utilized to cause this deformation allows a friction fit between neutron absorber 600, (i.e. first portion 610, second portion 620, and third portion 630), and first wall 420 and second wall 425. The friction fit results from first wall 420 and second wall 425 preventing a full elastic return of first portion 610, second portion 620, and third portion 630 to their static angular positions relative to one another. The force resulting from stored potential energy due to the deformation of third portion 630 causes the frictional fit when the stress is released.

Neutron absorber 600 also includes notches 640 adapted to receive grippers 710 of a neutron absorber installation tool 700 as depicted in FIGS. 9–12. Notches 640 may also serve to engage portions of first wall 420 and second wall 425 to lock neutron absorber 600 in position abutting these cell walls.

Installation tool 700 includes a plurality of cylinders 720 adapted to apply stresses at a plurality of notches 640 via grippers 710. Such stresses may be utilized to deform neutron absorber 600 or portions thereof For example, FIG. 12 depicts neutron absorber 600 having third portion 630 deformed by installation tool 700 such that an angle 625 between first portion 610 and second portion 620 is less than an angle between two cell walls of a cell of a fuel storage rack (not shown). These cell walls may, for example, have angles of ninety degrees therebetween and thus a deformation of third portion 630 might cause angle 625 to be less than ninety degrees.

Figure 9:
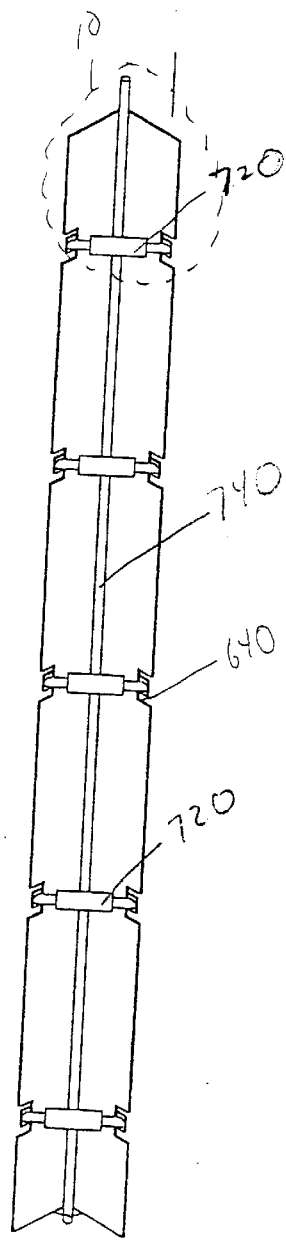
FIG. 9 is a side elevational view of the neutron absorber of FIG. 7 in combination with an installation tool in accordance with the principals of the present invention.
Figure 10:
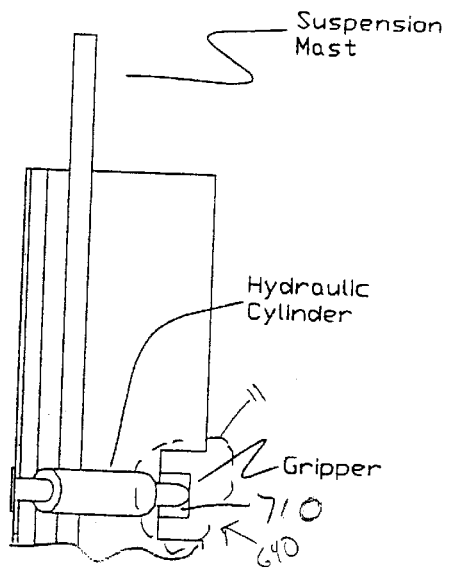
FIG. 10 is an enlarged side perspective view of a portion of the neutron absorber and installation tool of FIG. 9.
Figure 11:
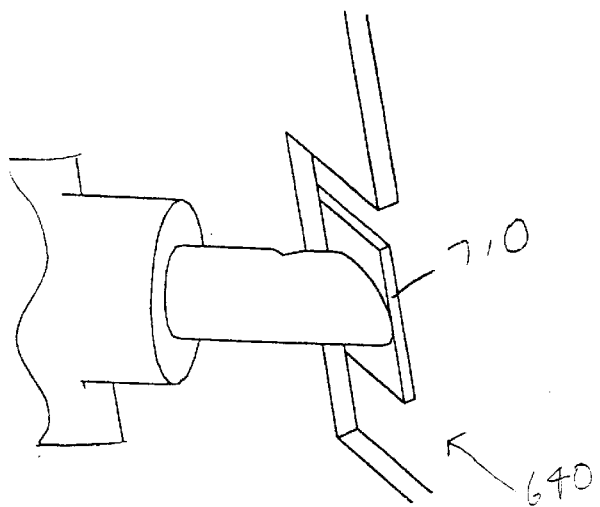
FIG. 11 is an enlarged side perspective view of a portion of the installation tool and neutron absorber of FIG. 10.
Figure 15:
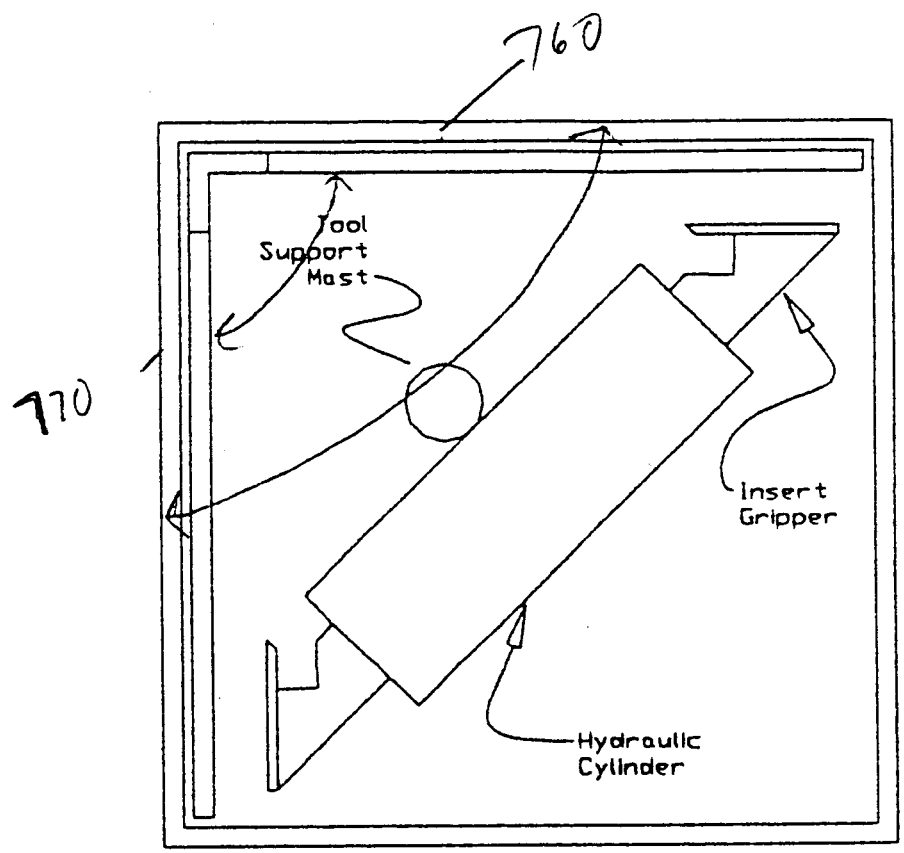
FIG. 15 is a top elevational view of the neutron absorber and installation tool of FIG. 14 showing the neutron absorber released from the installation tool

Also, referring to FIG. 9, installation tool 700 includes a supporting mast 740 which connects and supports cylinders 720. By applying a stress to several pairs of notches 640 using grippers 710, an entire length of neutron absorber 600 may be deformed. Further, neutron absorber 600 may be lifted and manipulated using installation tool 700. FIG. 13 illustrates neutron absorber 600 attached to installation tool 700 being inserted into a cell 750 of a fuel storage rack. FIG. 14 depicts neutron absorber 600 in a deformed position held by installation tool 700 in cell 750, wherein angle 625 is less than an angle 775 between a first cell wall 760 and a second cell wall 770. FIG. 15 illustrates neutron absorber 600 attached to first cell wall 760 and second cell wall 770 after release of the stress on notches 640 by installation tool 700. Advantageously, installation tool 700 is formed of materials which can be easily decontaminated, for example, stainless steel.

It will be understood by those skilled in the art that installation tool 700 could be used to deform and install neutron absorber 300, 600 or a neutron absorber of any other shape or size which includes notches or other means to receive a stress. Also, it will be understood by those skilled in the art that neutron absorber 600 and neutron absorber 300 could be formed in any shape or size to conform to cell walls of spent fuel storage racks of various shapes or sizes. Moreover, neutron absorber 300 and neutron absorber 600 could be formed to include more than two portions such as first portion 320 and second portion 325, corresponding to more than two cell walls, e.g., first wall 420 and second wall 425. Further, notches 310 and notches 640 may be formed in neutron absorber 300 and neutron absorber 600 at any number of locations to serve as capture points for engaging cell walls having various characteristics. Yet, further, neutron absorber 300 and neutron absorber 600 may include other features for engaging cell walls.

Figure 16:
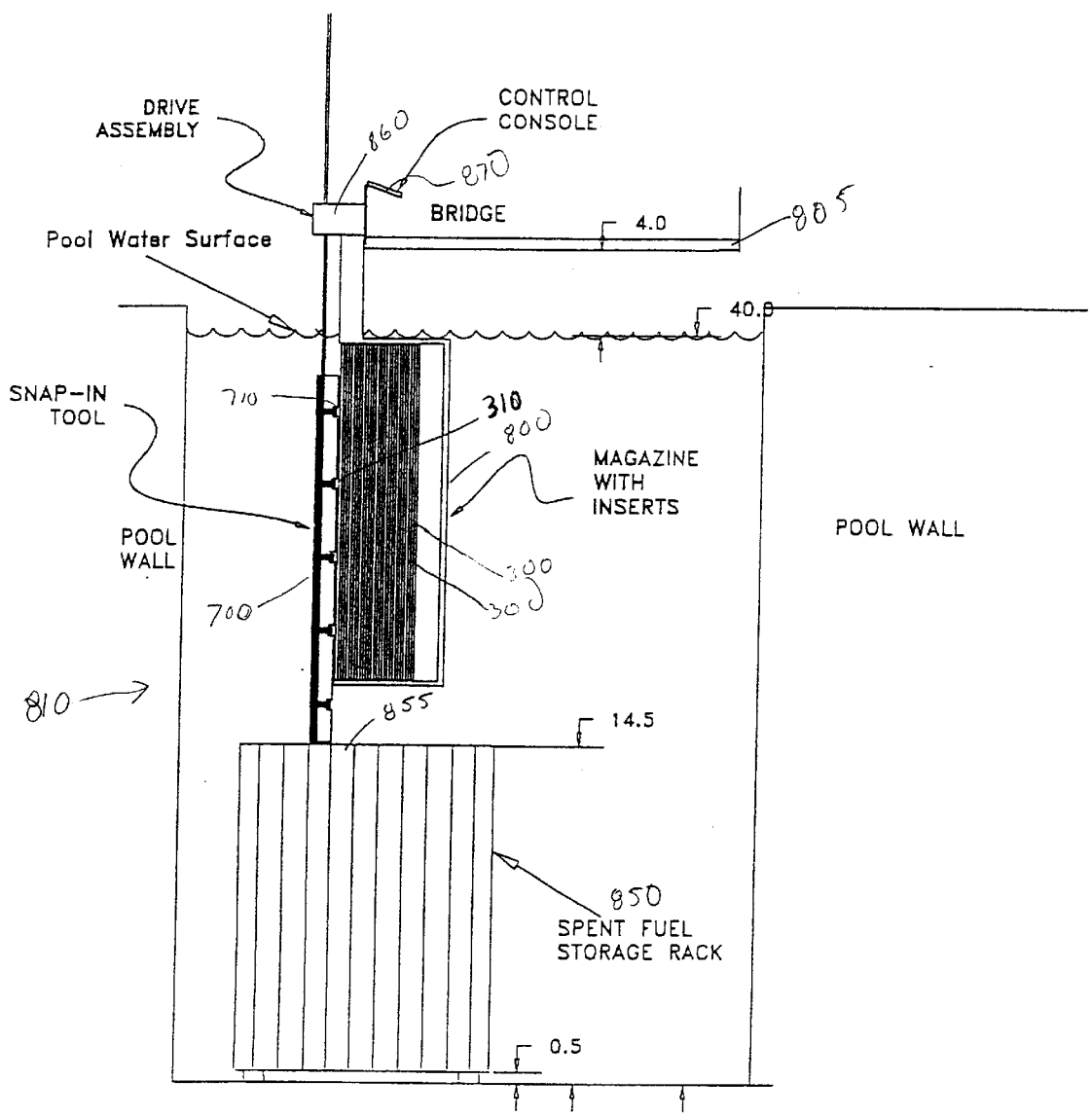
FIG. 16 is a side elevational view of a fuel storage rack, a magazine containing neutron absorbers, a drive assembly to drive an installation tool for inserting the neutron absorbers into cells of the fuel storage rack, and a spent fuel storage rack bridge.
Figure 17:
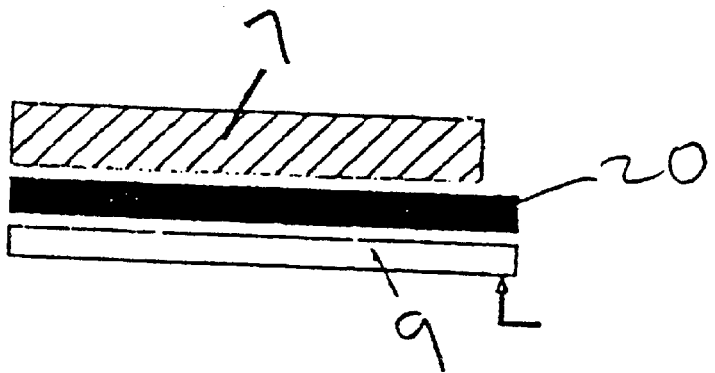
FIG. 17 is an enlarged top elevational view of a portion of the flux trap nuclear fuel storage rack of FIG. 1.
Figure 18:
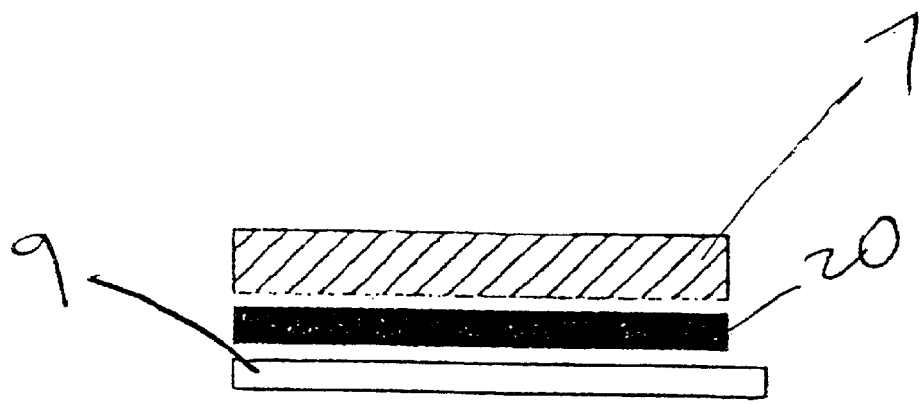
FIG. 18 is an enlarged top elevational view of a portion of the eggcrate nuclear fuel storage rack of FIG. 2.

One method of inserting a neutron absorber into a cell of a fuel storage rack is described as follows with reference to FIGS. 3–4 and 16. A magazine 800 mounted to a spent fuel storage rack bridge 805 holds a plurality of neutron absorbers 300 in a pool 810 containing water and a spent fuel storage rack 850. Installation tool 700 is located in pool 810 connected to a drive assembly 860 located above pool 810 controlled by a controller (not shown) programmed by a user at a control console 870. The user may program the controller to control drive assembly 860 to three dimensionally align installation tool 700. Further, the controller (not shown) may be programmed by the user to cause drive assembly 860 to cause installation tool 700 to align grippers 710 with notches 310 and apply a stress to notches 310. Thus, the user may cause angle 330 between first portion 320 and second portion 325 to be less than an angle between two cell walls of a cell 855 of fuel storage rack 850. The controller may be programmed to cause installation tool 700 to be lifted from magazine 800 together with neutron absorber 300. Drive assembly 860 may thus cause neutron absorber 300 to be inserted into a cell 855 of spent fuel storage rack 850. Neutron absorber 300 may be manipulated against two walls of cell 855 through programming of the controller by the user and the stress exerted by grippers 710 on notches 310 may be released. Thus, neutron absorber 300 may be attached to the walls of cell 855 via a frictional fit, as described above. This process may be repeated for each cell of fuel cell storage rack 850.

It will be understood by those skilled in the art that this method may be utilized for installation of neutron absorber 600 or neutron absorbers of any other shape or size, for example, those which include notches to receive installation tool 700. It will also be understood by those skilled in the art that cylinder 720 of installation tool 700 may utilize pneumatic, hydraulic, or other means of applying forces to neutron absorber 300 or neutron absorber 600.

The embodiments described herein are just examples. There may be many variations to the method and/or devices described herein without departing from the spirit of the invention. For instance, the operational steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A neutron absorber system for a cell of a nuclear fuel storage rack, comprising:

a neutron absorber having a first longitudinal portion and a second longitudinal portion, said first longitudinal portion and said second longitudinal portion having an angle therebetween greater than an angle between adjacent cell walls of the cell of the nuclear fuel storage rack, said first longitudinal portion and said second longitudinal portion being elastically deformable toward each other in response to a stress being placed thereon;

an installation tool configured to provide the stress to the neutron absorber to elastically deform said first longitudinal portion and said second longitudinal portion;

said installation tool configured to insert said neutron absorber into the nuclear fuel storage rack; and said installation tool configured to release the stress on the neutron absorber said first longitudinal portion and said second longitudinal portion configured to abut the adjacent walls of the cell in response to the release of the stress to cause a frictional fit between the first longitudinal portion and the second longitudinal portion and the adjacent walls of the cell to attach the neutron absorber to the adjacent walls of the cell of the nuclear fuel storage rack.

2. The system of claim 1 wherein said neutron absorber comprises a chevron shape.

3. The system of claim 1 wherein the cell angle is about ninety degrees.

4. The system of claim 1 wherein the cell walls are vertical walls of the nuclear fuel storage rack.

5. The system of claim 1 wherein said neutron absorber further comprises a plurality of notches configured to engage said installation tool.

6. The system of claim 1 wherein said plurality of notches is configured to receive the stress from said installation tool to cause the elastically deforming of the first longitudinal portion and the second longitudinal portion.

7. The system of claim 5 wherein at least one of said plurality of notches is cooperatively engageable with the plurality of cell walls.

* * * * *